(12) United States Patent
Korlapati et al.

(10) Patent No.: US 9,378,243 B1
(45) Date of Patent: Jun. 28, 2016

(54) PREDICATE-BASED RANGE SET GENERATION

(71) Applicant: Teradata US, Inc, Dayton, OH (US)

(72) Inventors: Rama K. Korlapati, El Segundo, CA (US); Haiyan Chen, Salt Lake City, UT (US); Tri Minh Tran, Los Alamitos, CA (US)

(73) Assignee: Teradata US, Inc., Dayton, OH (US)

( * ) Notice: Subject to any disclaimer, the term of this patent is extended or adjusted under 35 U.S.C. 154(b) by 161 days.

(21) Appl. No.: 14/135,653

(22) Filed: Dec. 20, 2013

Related U.S. Application Data

(60) Provisional application No. 61/747,772, filed on Dec. 31, 2012.

(51) Int. Cl.
*G06F 17/30* (2006.01)

(52) U.S. Cl.
CPC .... *G06F 17/30454* (2013.01); *G06F 17/30469* (2013.01)

(58) Field of Classification Search
CPC ............... G06F 17/30448; G06F 17/30451; G06F 17/30454; G06F 17/30457; G06F 17/3046; G06F 17/30463; G06F 17/30466; G06F 17/30469
See application file for complete search history.

(56) References Cited

U.S. PATENT DOCUMENTS

| | | | | |
|---|---|---|---|---|
| 6,353,821 B1* | 3/2002 | Gray | ................ | G06F 17/30321 707/715 |
| 6,504,571 B1* | 1/2003 | Narayanaswami | | G06F 17/30265 348/231.99 |
| 7,188,098 B2* | 3/2007 | Chen | ................ | G06F 17/30454 |
| 8,768,916 B1* | 7/2014 | Ghazal | .............. | G06F 17/30592 707/719 |
| 2009/0182724 A1* | 7/2009 | Day | ................ | G06F 17/30442 |
| 2012/0191697 A1* | 7/2012 | Sherman | ........... | G06F 17/30427 707/717 |

OTHER PUBLICATIONS

Poosala, Viswanath, et al. "Improved histograms for selectivity estimation of range predicates." ACM SIGMOD Record. vol. 25. No. 2. ACM, 1996.*

* cited by examiner

*Primary Examiner* — William Spieler
(74) *Attorney, Agent, or Firm* — Randy L. Campbell, Jr.

(57) ABSTRACT

A system may include a storage device configured to store a data store comprising data. The database system may further include a processor in communication with the storage device. The processor may receive a query that includes at least one predicate associated with the data. The processor may further determine that the at least one predicate is eligible to be converted to a range set predicate. The processor may further convert the at least one predicate to a range set predicate. The processor may further process the query with the range set predicate. A method and computer-readable medium may also be implemented.

20 Claims, 6 Drawing Sheets

PREDICATE-BASED RANGE SET GENERATION

CLAIM OF PRIORITY

This application claims the benefit of priority under 35 U.S.C. §119(e) of U.S. Provisional Patent Application Ser. No. 61/747,772 filed on Dec. 31, 2012, the entirety of which is hereby incorporated by reference herein.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Database queries often have multiple range predicates on same field, or on same expression. One simple example is a closed range, such as "1_shipdate BETWEEN '2011-12-01' AND '2011-12-24'". It has two conjunct range predicates: "1_shipdate>='2011-12-01' AND 1_shipdate<='2011-12-24'". The multiple range predicates on the same field can be mixed with predicates on other fields. Thus range condition sensitive tasks, such as range scan access path and selectivity estimation, keep looking for range conditions in the whole list of query predicates.

Some business applications generate overlapping range predicates. One scenario is access right control in view definition. The access right predicates in view definition is conjunct with user-specified conditions. For instance, view definition restricts the user to only accessing rows in a column "department_no" between 1 and 10. The user-specified predicates include "department_no IN (5, 15)." Without intersecting the two range conditions, range-condition-sensitive tasks often proceed and base the optimization on one of the multiple ranges. A coverage algorithm cannot report correct coverage when handling overlapping range conditions.

SUMMARY

According to one aspect of the present disclosure, a system may include a data store that includes data. The database system may further include a processor in communication with the storage device. The processor may receive a query that includes at least one predicate associated with the data. The processor may further determine that the at least one predicate is eligible to be converted to a range set predicate. The processor may further convert the at least one predicate to a range set predicate. The processor may further process the query with the range set predicate.

According to another aspect of the present disclosure, a method may include receiving a query that includes at least one predicate associated with data stored in a data store. The method may further include determining that the at least one predicate is eligible to be converted to a range set predicate. The method may further include converting the at least one predicate to a range set predicate. The method may further include processing the database query with the range set predicate.

According to another aspect of the present disclosure, a computer-readable medium may be encoded with a plurality of instructions executable by a processor. The plurality of instructions may include instructions to receive a query that includes at least one predicate associated with data in a data store. The plurality of instructions may further include instructions to determine the at least one predicate is eligible to be converted to a range set predicate. The plurality of instructions may further include instructions to convert the at least one predicate to a range set predicate. The plurality of instructions may further include instructions to process the query with the range set predicate.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
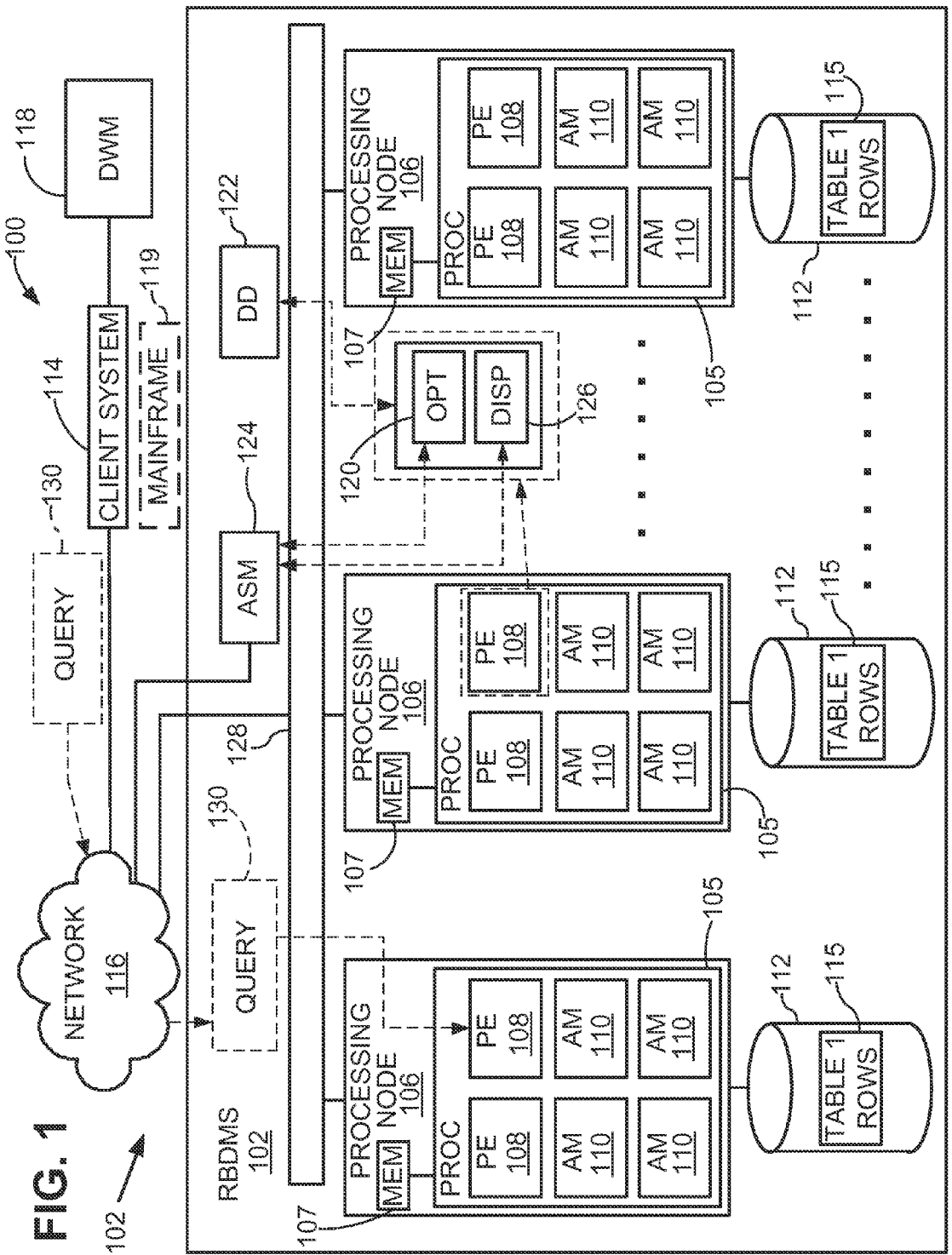
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RBDMS 102 may include an active system management (ASM) module 124. The ASM module 124 may be implemented as a "closed-loop" system management (CLSM) architecture capable of satisfying a set of workload-specific goals. In other words, the RBDMS 102 is a goal-oriented workload management system capable of supporting complex workloads and capable of self-adjusting to various types of workloads. The ASM module 124 may communicate with each optimizer module 120, as shown in FIG. 1, and is adapted to convey a confidence threshold parameter and associated parameters to the optimizer module 120 in communication. Further, the ASM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the ASM module 124 via the network 116.

The ASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation of the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
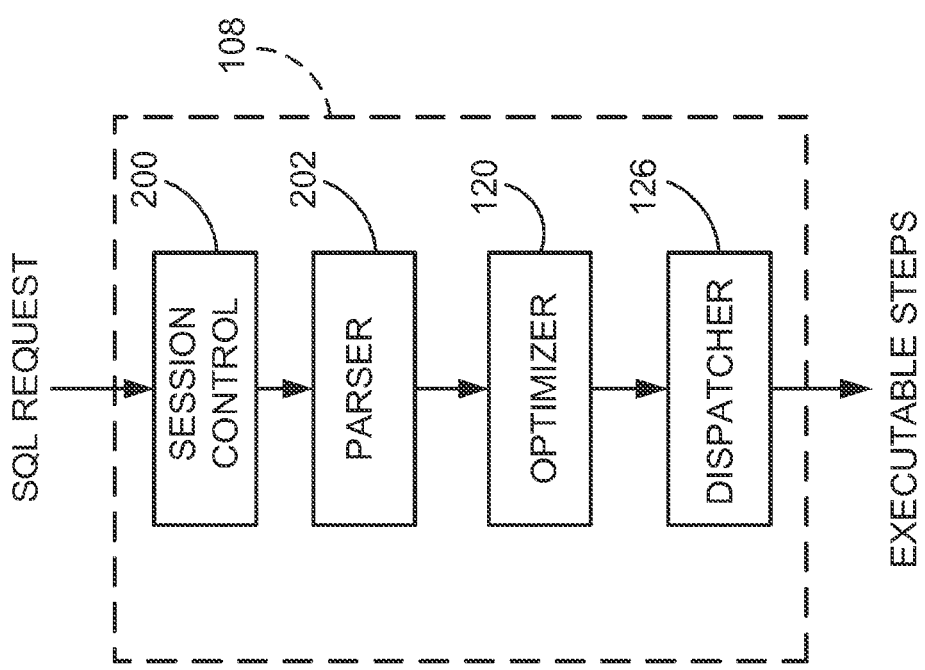
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, a SQL request may be received such as through submission by a user and the SQL request is routed to the parser module 202.

Figure 3:
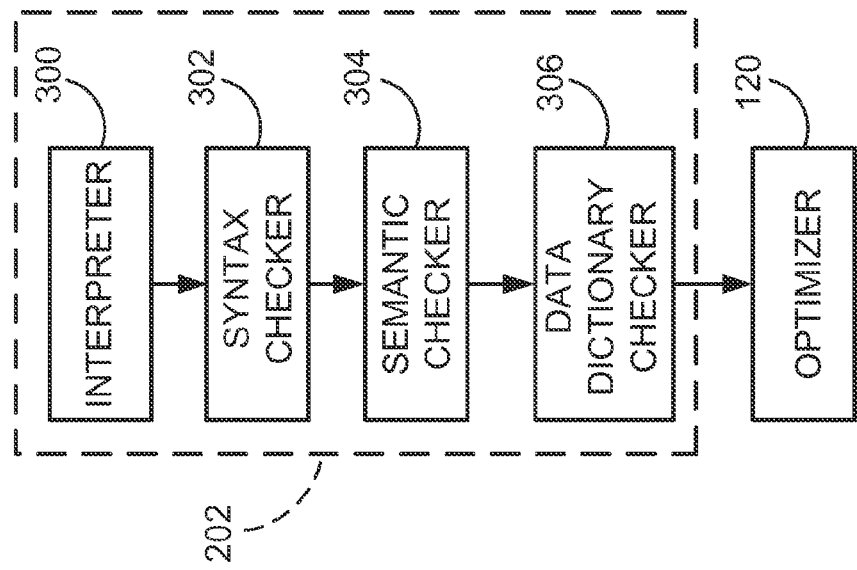
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the ASM 124 is configured to monitor runtime exception criteria. The ASM 124 monitoring takes place by communicating with the dispatcher module 126 as it checks the query execution step responses from the access modules 110. The step responses include the actual cost information, which the dispatcher module 126 may then communicate to the ASM 124 which, in turn, compares the actual cost information with the estimated costs of the optimizer module 120.

During operation, queries received by the database system 100 may contain various range predicates. Range predicates may be predicates that contain range conditions on various columns or rows of a database table. These predicates are ultimately received by the optimizer module 120 and evaluated separately when generating selectivity estimates. In many instances, the optimizer module 120 may evaluate each predicate statement separately and may use histogram data to determine selectivity estimates with respect to each predicate. Operating in such a manner requires the optimizer module 120 to traverse the histograms multiple times.

In one example, the database system 100 may be configured to consolidate qualifying predicates into a single range set based on range conditions of the predicates. Consolidation of the predicates may allow selectivity estimation to be simplified, more efficient, and yield better estimates. In one example, the database system 100 may consider consolidation of any predicates into range sets through unions and intersections, such as those including the following example operations:

Equality (=);
Non-equality (< >);
Greater than (>, >=);
Less than (<, <=);
IS NULL;
IS NOT NULL;
IN
NOT IN; and
BETWEEN.

The database system 100 may consolidate predicates to a range set predicate having these qualifying characteristics and range set conditions. Any predicate that may be considered for range set consolidation may be considered a range-set-eligible (RSE) predicate. Inside the range set predicate, there may be multiple disjunctive ranges sorted in ascendant order. Below is a list of examples:

Example 1

IN-list predicates "x in (1, 2, 3, 4, 5, . . . , 100) may be converted to "x in range set {[1,100]};"

Example 2

IN-list predicates "(x between 20 and 200) OR (x between 100 and 300) OR (x>500)" may be converted to "x in range set {[20,300], [500, +∞]}";

Example 3

IN-list predicates "(x=10) OR (x is NULL)" may be converted to "x in range set {[10, 10], [null, null]}"; and Example 4

IN-list predicates "(x>10) AND (x is NOT NULL)" may be converted to "x in range set {[10, +∞]}.

Histograms may be used by the optimizer module 120 when evaluating selectivity estimations used in query response planning Converting multiple RSE predicates to a single range set predicate allows the histogram to be traversed only once instead of multiple times, which saves valuable resource time in the database system 100. Secondly, use of range set predicates allows flexibility in determining which range set type to use, such as an interval set form or a point range form using an IN-list form. When using range set predicates, the decision to use an interval set form or a point range form may be based on various considerations such as particular algorithms used for selectivity estimation or access paths, for example.

For large IN/NOT IN-lists, sampling may be used in analyzing a histogram, whereas the interval set form may be better suited for analysis of the full histogram. The database system 100 may use thresholds to make such a determination. The threshold may be selected on a case-by-case basis, which may depend on various considerations such as parsing time versus estimation accuracy. The database system 100 may determine the number of values included in a histogram prior to generating selectivity estimations. This number may be used with the threshold if the threshold is based on the number of values. In using the IN-list forms, sampling of histograms may be used to allow unifying range predicates and equality predicates and the selectivity estimation can choose the better form depending on the algorithm, which also provide the flexibility in choosing light-weight selectivity estimation for a large IN/NOT IN list for even data distribution versus better estimation with heavy-weight selectivity estimation.

With regard to traversing the histogram only once, Example 1 may be considered. In Example 1, without the range set predicate, the associated histogram would be retrieved one hundred times and for each value, the histogram would be traversed from the beginning to find a matching histogram interval. However, using the range set predicates allows a single retrieval of the histogram and begins searching the first matching interval for the low bound (>=) and continues through until the first mismatching interval for the upper bound of the closed range (<=100).

Through consolidation of the range form predicates, the selectivity estimation may increase in accuracy due to avoiding the process of combining selectivity estimations for multiple range predicates. For example, with reference to Example 4, without range form predicate consolidation, the predicate "(x>10) AND (x is NOT NULL)," selectivity estimation would occur for the expression "(x>10)", then selectivity estimation would occur for the expression "(x is NOT NULL)." After determining both selectivity estimations, a formula/equation would be used to combine the selectivity estimations, which may result in selectivity estimation with poor accuracy due to assumptions regarding the formula/equation, such as the independency or correlations for the columns in the range predicates, which may not be true for every column. Consolidating the range form predicates may allow selectivity estimation for the single range set [10, +∞], which avoids the situation causing the poor accuracy of the multiple range predicates.

With regard to multi-column histograms, additional optimization through range set predicates may be implemented. In using multi-column statistics, equality conditions on all histogram fields are the range conditions that can result in the best estimation. Thus, there is additional use to dynamically expand range conditions on multiple discrete columns into IN-list values. Even with the expanded IN-list values, the histogram only needs to be traversed once to get the combined selectivity for the range conditions on multiple columns.

For example, for columns x and y (integer type), the following predicate may be:

Example 5

((x BETWEEN 10 AND 20)) AND ((x<15 OR X=9)) AND ((y BETWEEN 220 AND 230) OR (y BETWEEN 200 AND 500))

A multi-column histogram on x and y may provide challenges in using the histogram directly for estimating the selectivity for the predicate. However, use of a range set predicate allows the predicate of Example 5 to be expressed as "x in range set {[9, 15])} AND y in range set {[200, 500]}" in interval set form and then be expanded into multiple point ranges which are generated by combining discrete values from x and y, such as "x, y in range set {[9, 200; 9,200], [9,201; 9, 201], ..., [15, 499; 15, 499], [15, 500; 15, 500]}. For each point range, the multi-column histogram on x and y may be used to estimate the individual selectivity of each point range and then combine all the selectivities to get the final selectivity of the predicate.

Due to the holes in the combined values, such as no matching value for (x=10, y=221) for example, expanded IN-lists using point range forms, such as this may cause overestimation. For example, (x, y) have 10 combined values, which would result in more than 100 point range values. Overestimation may be addressed by implementing upper limits on the number of matched values. The number of point ranges in the point range form may not exceed the number of matched values.

Range set predicates may be applied to large IN-lists with an excessive number of values. In such scenarios, the average selectivity of the first k values may be used to extrapolate the selectivity of the whole IN-list. For example, "selectivity_k" may be the selectivity of k IN-list values and the total number of values in the IN-list may be a number n. The selectivity of the IN-list with n values is n*(selectivity_k/k). Sampling may be extended into range sets having excessive ranges, such as large single point ranges. The sampling may reduce the overhead of histogram traversal for the range set with an excessive number of ranges. The excessive number of ranges in a range set may occur for non-discrete columns or non-consecutive values in predicates. An example may be:

Example 6

A predicate may be provided as "x IN (3, 5, 7, 9, 11, ..., 997, 999) OR x in (2000, 2100, 2200, ..., 2900, 3000)" where the values are all non-consecutive. The predicate may first be consolidated into a range set predicate with 510 point ranges: "x in range set {[3, 3], [5, 5], [7, 7], ..., [997,997], [999, 999], [2000, 2000], ..., [2900, 2900], [3000, 3000]}." By sampling a predetermined number of k values, such as 50, the selectivity for these 50 values is determined. If the selectivity for k=50 is 0.01, then the selectivity for the entire predicate may be extrapolated from the equation n*(selectivity_k/k), which when evaluated is 510/(0.01/50)=0.102.

The sampling may also be successfully applied to evenly distributed data and when the IN-list values of a range form predicate are not skewed values. In such a scenario, the sampling method provides accurate estimation with reduced overhead in calculating selectivity for each value. When IN-list values are skewed values, especially those out of the sampled values for estimation, underestimation issues may occur. If underestimation leads to non-optimal plans and performance issues arise in executing the query plan, more parsing time may allow better estimation by sampling more values in the IN-list, which may reduce execution time. The tradeoff between parsing time and estimation accuracy may vary per workload. Thus, in one example, a selectable threshold may be implemented for the number of values or percentage of values that are sampled in the IN-list values. Additionally, similar handling may be applied when expanding range sets on multiple ranges into combined IN-list values as the number of combined IN-list values may be very large. For example, given three range sets, each with 10 discrete values, the number of combined IN-lists may grow to one thousand.

Figure 4:
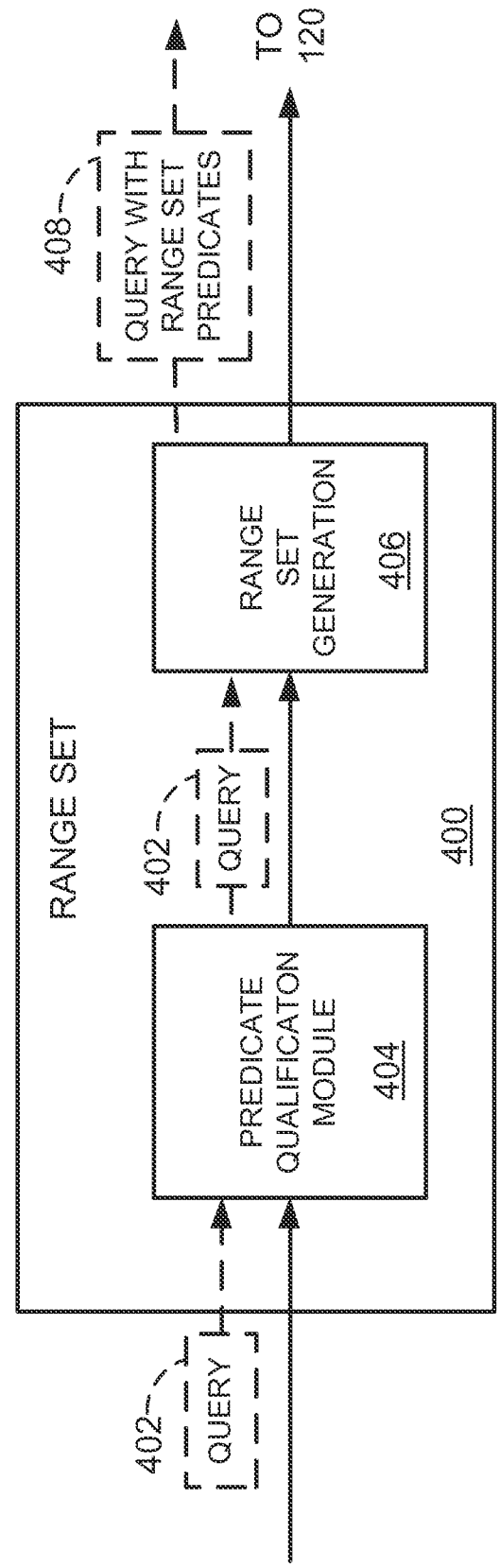
FIG. 4 is a block diagram of example operation of the example database system of claim 1.

FIG. 4 is a block diagram of an example of a software environment executable by the database system 100 to determine and generate range set predicates for queries being processed by the database system 100. In one example, a range set module 400 may be executable by one or more access modules 110. The range set module 400 may be stored in the database system 100 and retrieved each time a query is processed by the database system 100. In one example, the range set module 400 receives a query 402, which may contain one or more predicate statements. The range set module 400 may consolidate RSE predicates in a database query to one or more range sets. In performing such a conversion, range-set selectivity estimation to be implemented by the optimizer module 120. The range-set selectivity estimation allows a histogram to be traversed once to gather statistics associated with a range set, as well as allows of range sets for multi-column histograms.

The range set module 400 may include a predicate qualification module 404. The predicate qualification module 404 may evaluate any predicate statements of the query 402 to determine if the predicate statements may qualify to be consolidated into range sets. In one example, the predicate qualification module 404 may determine if any of the predicates include a predetermined number of functions or conditions, such as those previously identified to be considered RSE predicates.

If the query 402 contains predicates that qualify to be consolidated to a range set predicate, the predicate qualification module 404 may pass the query 402 to a range set generation module 406. The range set generation module 406 may determine if the qualifying predicate statements are to be converted and, if so, convert the qualifying predicates into range sets to create the query with range sets 408, such as interval set form or point range form. With regard to multi-column range predicates, the range set generation module 406 may utilize a number of matched values to cap a number of point ranges generated to reduce overestimation. The range set generation module 406 may determine the number of matched values regarding the columns being considered for a range set. If a number of point ranges are to be generated in the range set, the range set generation module 406 may cap the number of point ranges to the number of matched values. The query with range sets 408 may be passed to the optimizer module 120 to use in planning a query response. The range sets generated by the range set generation module 406 may be used with histogram data obtained by the optimizer module 120.

Figure 5:
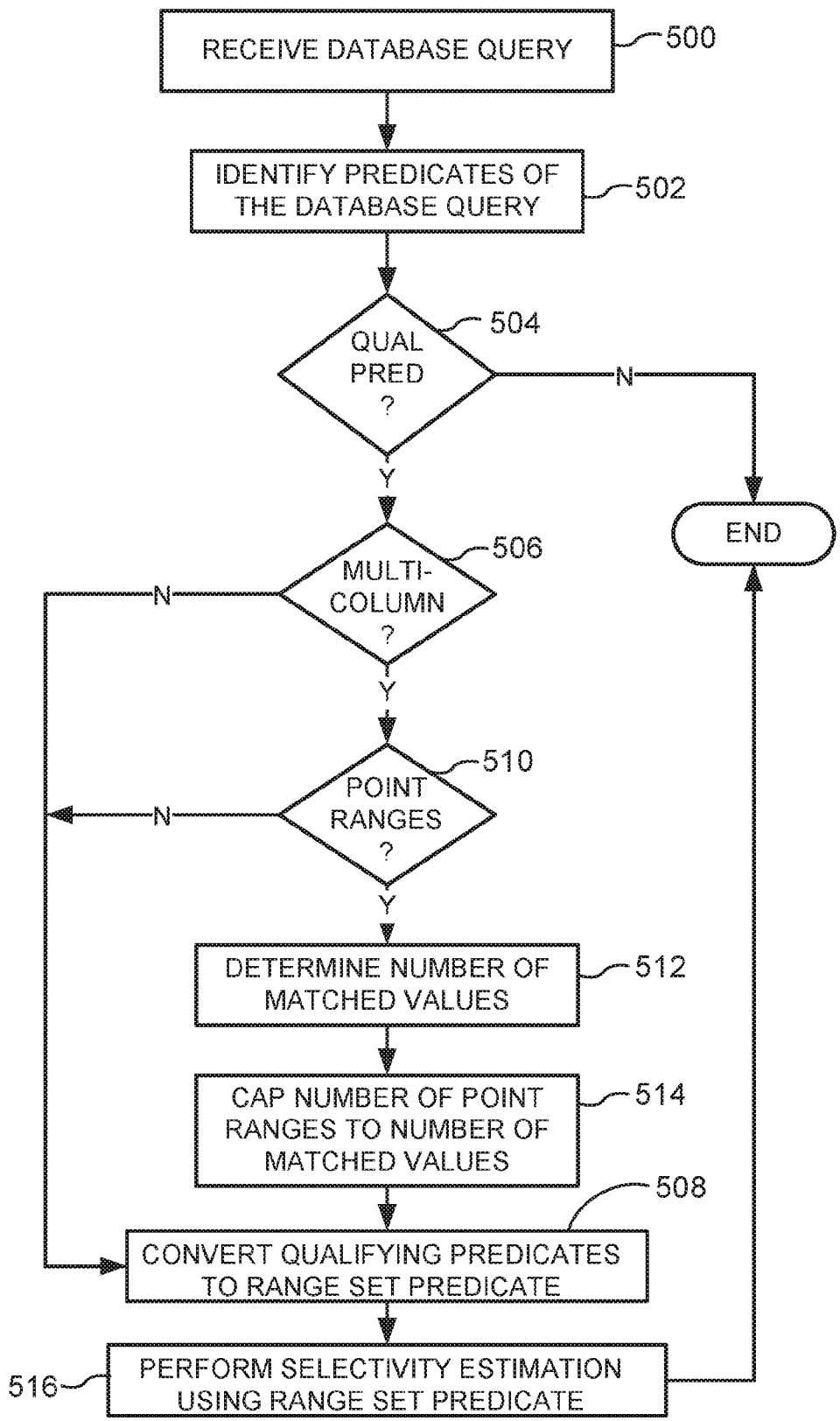
FIG. 5 is an operational flow diagram of example operation of a database system.

FIG. 5 is an operational flow diagram of example operation of the database system 100 during range set determination and conversion. In one example, the database system 100 may receive a database query (500). The database system 100 may identify predicates included in the database query (502). The database system 100 may determine if any of the identified predicates include statements and conditions that qualify for conversion to range sets, e.g. RSE predicates (504). If no predicates qualify, no further action is taken by the database system 100 regarding range set conversion.

If one or more predicates qualify, the database system 100 may determine if the qualifying predicates involve multiple columns (506). If multi-columns are not involved, the qualifying predicates may be converted to an interval set form in accordance with parameters of the database system 100 (508). If multi-columns are involved, the database system 100 may determine if point ranges are to be used in converting the qualifying predicates to a range set (510). In one example, the use of point ranges may be a dynamic decision based on other aspects of the qualifying predicates. In alternative examples, use of point ranges may be predetermined in the database system 100.

Figure 6:
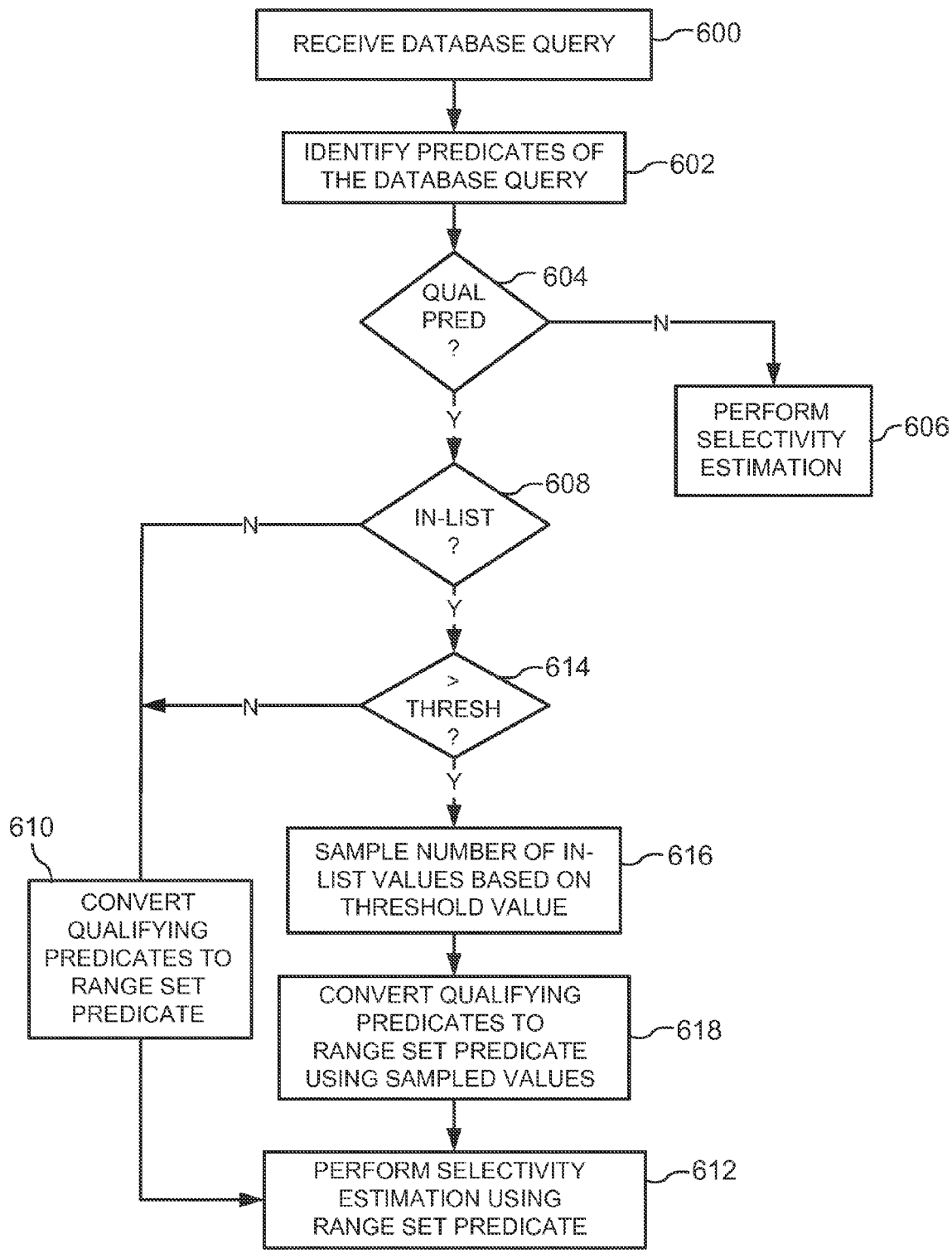
FIG. 6 is another operational flow diagram of example operation of a database system.

If point ranges are not to be used, the qualifying predicates may be converted to an interval set form in accordance with parameters of the database system 100 (508). If point ranges are to be used, the number of matched values of the columns involved with the query may be determined (512). The number of point ranges may be capped at the number of matched values (514). The qualifying predicates may then be converted to a range set using a number of point ranges no greater than the number of matched values (508). Selectivity estimation may be performed using the range sets (516). If so, the database system 100 may determine the number of matching values involved with the predicates (508). The database system 100 may cap the number of point ranges that may be generated from the range sets predicates (510), such as in query response planning FIG. 6 is an operational flow diagram of example operation of the database system 100 during consideration of large IN-list predicates prior to selectivity estimation. In one example, the database system 100 may receive a database query (600). The database system 100 may identify predicates included in the database query (602). The database system 100 may determine if any of the identified predicates include statements and conditions that qualify for conversion to range sets, e.g. RSE predicates (604). If no predicates qualify, no further action is taken by the database system 100 regarding range set conversion and selectivity estimation may occur without range sets being implemented (606).

If one or more predicates qualify, the database system 100 may determine if the qualifying predicates contain IN-lists (608). If not, the qualifying predicates may be converted to an appropriate range set predicate (610), such as an interval set form or point range form, and selectivity estimation may be performed by the database system 100 for the range set predicate (612). If a qualifying predicate includes an IN-list, the database system 100 may determine if the number of values in the IN-list exceeds a predetermined value threshold (614). If the threshold is not exceeded, the qualifying predicate may be converted to point ranges (610) and selectivity estimation may be performed for the range set (612). If the threshold is exceeded, the IN-list may be sampled at a number of values equal to the threshold value (616). In an alternative example, the threshold may be a percentage of values of the IN-list. Upon sampling the values of the IN-list, the sampled values may be converted to a range set predicate (618). Selectivity estimation may be performed on the range set predicate using sampled values (612).

In some tasks, the optimizer module 120 may use information that indicates if a set of predicates are a superset or subset of the rows of a database table selected by another set of predicates. In one example, a "coverage algorithm" may be used to make such determinations with respect to the rows. The coverage algorithm may be used in discovering join index or materialized views that may be used to rewrite a query. Another use is whether statistics collected on a join index can be used for selectivity estimation of a base table. Conventionally, a coverage algorithm is SQL-query-predicate oriented, which might not be aware of all range conditions on the same column. Use of the range set predicates may discover coverage for an overlapped range. For example, a join index creation in data definition language (DDL) may include:

Create join index ji2 as select * from ordertb1
where (order_date between '2011-1-1' and '2011-12-31';
and a query may include:
select * from ordertb1
where (order_date between '2011-2-1' and '2011-2-28')
OR
order_date between '2011-11-1' and '2011-11-31')
After a conversion to a range set, join index conditions and query condition may be simplified to one range set, such as:
Join index condition—order_date in range set {['2011-1-1','2011-12-31']}→RangeSet1

Query condition—order_date in range set {['2011-2-1|2', '2011-2-28'],
['2011-11-1','2011-1-31']}→RangeSet2

For this join index condition and query condition, the coverage may be performed as follows:

If (RangeSet1.Contains(RangeSet2))
JI's rows are superset of Query results;
Else if (RangeSet2.Contains(RangeSet1))
Query results are superset of the rows in the join index.

As the coverage between range set term and non-range set term cannot be determined, the range-set-based coverage separates the terms to compare into two spaces: a range set term and a non-range set term, which reduces the number of comparisons.

Figure 7:
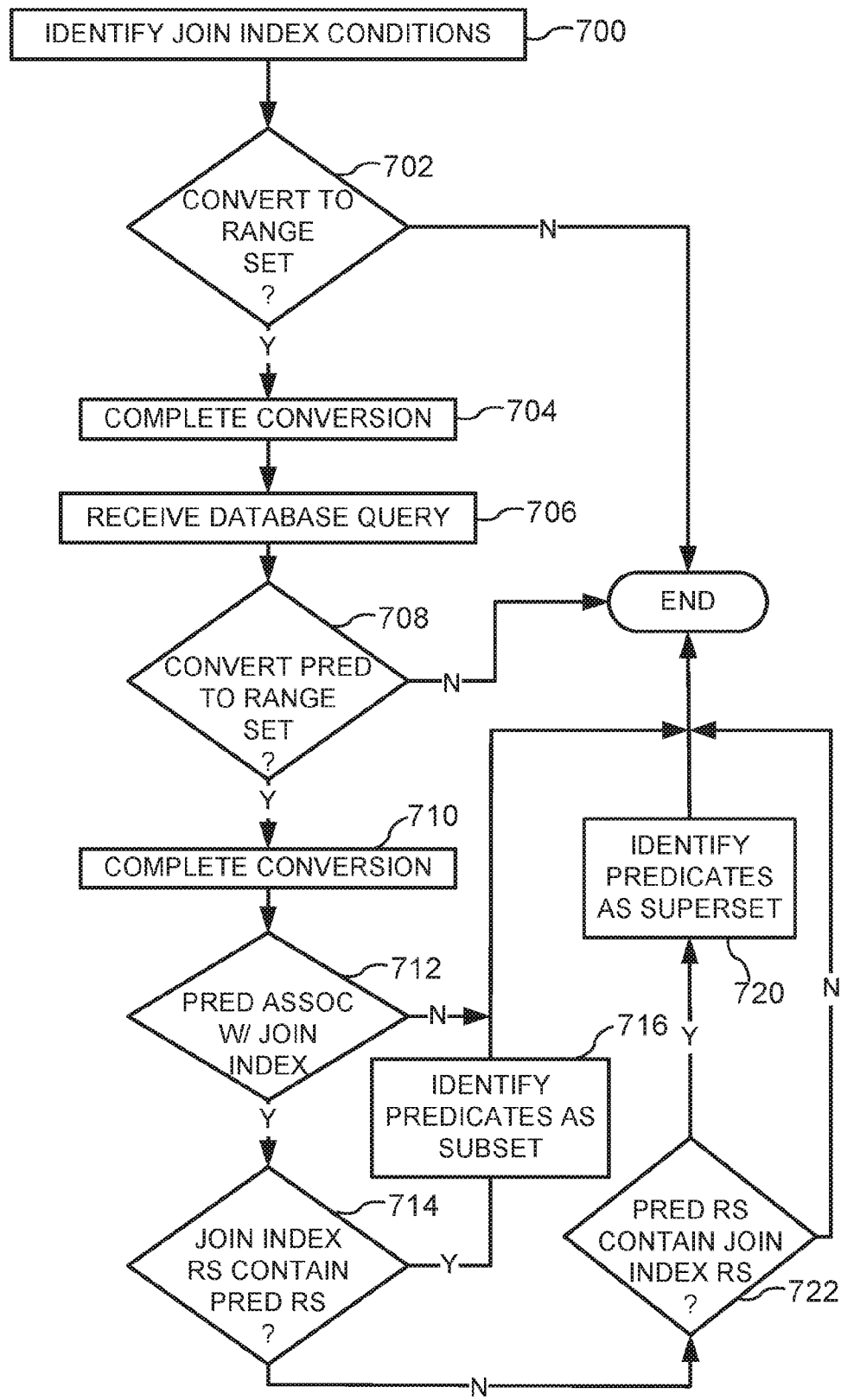
FIG. 7 is another operational flow diagram of example operation of a database system.

FIG. 7 is an operational flow diagram of example operation of the database system 100 in determining if database query predicates are supersets or subsets of a join index. In one example, the database system 100 may identify join index conditions (700). The database system may determine if the join index has conditions allowing conversion to a range set (702). If not, no further action is taken by the database system 100. If qualifying, the join index may be converted to a range set (704). The database system 100 may receive a database query (706). The database system 100 may determine if one or more predicates contained in the database query include qualify for range set conversion based on the conditions of the predicates (708). If the predicates do not qualify, no further action is taken by the database system 100. If the predicates qualify, the predicates may be converted to range set predicates (710). Once converted, the database system 100 may determine if the predicate range sets of the range set predicates are associated with the join index range set (712). If not, no further action is taken by the database system 100.

If the predicate range sets are associated with the join index range set, the database system may determine if the join index range set (RS) contains the predicate range sets (RS) (714). If so, the predicates may be identified as subsets (716). If not, the database system 100 may determine if the predicate range sets contain the join index range set (718). If so, the predicates may be identified as supersets (720). If not, no further action may be taken by the database system 100.

The range sets may also be implemented for access path planning, which may result in the optimum plan for accessing data. When the optimizer module 120 uses range forms and the unified set form to represent both range conditions of narrow definition and IN-lists, more access paths and join plans can be associated with a cost in query response planning. For instance, the following forms of predicates on index order_date may exist:

1). In-list form: order_date IN ('2011-1-1', '2011-1-2', '2011-1-3', '2011-1-4','2011-1-5')
2). Range form: order_date BETWEEN '2011-1-1' and '2011-1-5'

For the IN-list form, a particular access path may attempt a union index scan and an IN-list access path. For the range form, access path planning will determine a cost of a range scan on an index. With a unified range set form, all three access paths can be considered and compete for the optimum plan. The final form is generated dynamically from a range set according to the chosen plan.

While various example embodiments of the invention have been described, it will be apparent to those of ordinary skill in the art that many more embodiments and implementations are possible within the scope of the invention. For example, while the example embodiments have been provided in the context of a relational database system, the example embodiments and equivalents may be implemented in the any suitable data store system, such a as a file system or other data organization configuration. Accordingly, the invention is not to be restricted except in light of the attached claims and their equivalents.

We claim:

1. A system comprising:
a storage device configured to store a data store comprising data;
a processor in communication with the storage device, the processor configured to:
receive a query that includes at least one predicate associated with the data;
determine that the at least one predicate is eligible to be converted to a range set predicate based on content of the predicate;
in response to the determination that the at least one predicate is eligible to be converted to a range set predicate, create a range set predicate based on the content of the predicate; and
process the query with the range set predicate.

2. The system of claim 1, wherein the processor is further configured to:
identify presence of at least one condition in the at least one predicate; and
in response to the presence of the at least one condition, create the range set predicate.

3. The system of claim 1, wherein the data comprises a plurality of database tables, and wherein the at least one predicate involves multiple ranges of column values of at least one of the database tables, and wherein the processor is configured to:
identify a histogram associated with a column of the column values;
perform a selectivity estimation on the at least one predicate through a single traversal of the histogram using the range set predicate to perform a selection.

4. The system of claim 1, wherein the data comprises a plurality of database tables, wherein the at least one predicate involves multiple ranges of column values of a plurality of columns of at least one of the database tables, wherein the processor is further configured to determine a number of matched values in the plurality of columns, wherein the range set predicate includes a set of point ranges, and wherein a number of point ranges in the set of point ranges is limited to no greater than the number of matched values.

5. The database system of claim 1, wherein the data comprises a plurality of database tables, wherein the at least one predicate involves multiple ranges of column values of a plurality of columns of at least one of the database tables, and wherein the processor is further configured to:
determine a number of column values in the multiple ranges;
sample the number of column values in response to the number of column values in the multiple ranges being greater than a predetermined threshold; and
convert the sampled number of column values to the range set predicate.

6. The database system of claim 1, wherein the data comprises a plurality of database tables, and wherein the processor is further configured to:
identify a join index condition associated with at least one of the database tables;
determine presence of conditions to convert the join index condition to an index range set;
convert the join index condition to an index range set; and
determine if a range set of the range set predicate is one of a superset and a subset of the index range set.

7. The database system of claim 1, wherein the at least one predicate is configured to be represented by a plurality of range set forms, wherein the processor is further configured to:

determine an access path cost associated with each range set form;

select the range set form having the lowest cost; and convert the at least one predicate to the range set predicate of the selected range set form; and process the query with the range set predicate that includes comprising selected range set form.

8. A method comprising:

receiving, with a processor, a query that includes at least one predicate associated with data stored in a data store;

determining, with the processor, that the at least one predicate is eligible to be converted to a range set predicate based on content of the predicate;

in response to the determination that the at least one predicate is eligible to be converted to a range set predicate, creating, with the processor, a range set predicate based on content of the predicate; and processing, with the processor, the database query with the range set predicate.

9. The method of claim 8, further comprising identifying, with the processor, presence of at least one condition in the at least one predicate, wherein creating, with the processor, range set predicate comprises in response to presence of the at least on condition, creating, with the processor, the range set predicate based.

10. The method of claim 8, wherein the data comprises a plurality of database tables, wherein the at least one predicate involves multiple ranges of column values of at least one database table, and wherein the method further comprises:

identifying, with the processor, a histogram associated with a column of the column values; and performing, with the processor, a selectivity estimation on the at least one predicate through a single traversal of the histogram using the range set predicate to perform a selection.

11. The method of claim 8, wherein the data comprises a plurality of database tables, wherein the at least one predicate involves multiple ranges of column values of a plurality of columns of the at least one of the database tables, wherein the method further includes determining, with the processor, a number of matched values in the plurality of columns, wherein the range set predicate includes a set of point ranges, and wherein a number of point ranges in the set of point ranges is limited to no greater than the number of matched values.

12. The method of claim 8, wherein the data comprises a plurality of database tables, wherein the at least one predicate involves multiple ranges of columns of at least one database table, the method further comprising:

determining, with the processor, a number of column values in the multiple ranges; and sampling, with the processor, the number of column values in response to the number of column values in the multiple ranges being greater than a predetermined threshold, wherein converting, with the processor, the at least one predicate comprises converting the sampled number of column values to the range set predicate.

13. The method of claim 8, wherein the data comprises a plurality of database tables, and wherein to the method further comprises:

identifying, with the processor, a join index condition associated with at least one of the database tables;

determining, with the processor, presence of conditions to convert the join index condition to an index range set;

converting, with the processor, with the processor, the join index condition to an index range set; and determining, with the processor, if the range set predicate is one of a superset and a subset of the index range set.

14. The method of claim 8, wherein the at least one predicate is configured to be represented by a plurality of range set forms, wherein the method further comprises:

determining, with the processor, an access path cost associated with each range set forms; and selecting, with the processor, the range set form having the lowest cost, wherein converting, with the processor, the at least one predicate comprises converting, with the processor, the at least one predicate to the range set predicate to include the range set form, and wherein processing, with the processor, the query comprises processing, with the processor, the range set predicate with the selected range set form.

15. A computer-readable medium encoded with a plurality of instructions executable by a processor, the plurality of instructions comprising:

instructions to receive a query that includes at least one predicate associated with data in a data store;

instructions to determine the at least one predicate is eligible to be converted to a range set predicate based on content of the predicate;

in response to the determination that the at least one predicate is eligible to be converted to a range set predicate, creating instructions to create a range set predicate based on content of the predicate; and instructions to process the query with the range set predicate.

16. The computer-readable medium of claim 15, wherein the plurality of instructions further comprise:

instructions to identify presence of at least one condition in the at least one predicate; and instructions to create to in response to presence of the at least one condition.

17. The computer-readable medium of claim 15, wherein the data comprises a plurality of database tables, and wherein the at least one predicate involves multiple ranges of column values of at least one of the database tables, and wherein the plurality of instructions further comprise:

instructions to identify a histogram associated with a column of the column values;

instructions to perform a selectivity estimation on the at least one predicate through a single traversal of the histogram using the range set predicate to perform a selection.

18. The computer-readable medium of claim 15, wherein the data comprises a plurality of database tables, and wherein the at least one predicate involves multiple ranges of column values of a plurality of columns of the at least one of the database tables, wherein the plurality of instructions further comprise instructions to determine a number of matched values in the plurality of columns, wherein the range set predicate includes a set of point ranges, wherein a number of point ranges in the set of point ranges is limited to no greater than the number of matched values.

19. The computer-readable medium of claim 15, wherein the data comprises a plurality of database tables, and wherein the plurality of instructions further comprise:

instructions to determine a number of column values in the multiple ranges;

instructions to sample the number of column values in response to the number of column values in the multiple ranges being greater than a predetermined threshold; and instructions to convert the sampled number of column values to the range set predicate.

20. The computer-readable medium of claim 15, wherein the plurality of instructions further comprise:

instructions to identify a join index condition associated with at least one of the database tables;

instructions to determine presence of conditions to convert the join index condition to an index range set;

instructions to convert the join index condition to an index range set; and instructions to determine if a range set of the range set predicate is one of a superset and a subset of the index range set.

* * * * *